(12) United States Patent
Huapaya et al.

(10) Patent No.: US 7,831,922 B2
(45) Date of Patent: *Nov. 9, 2010

(54) WRITE ANYWHERE TOOL

(75) Inventors: Luis M. Huapaya, Redmond, WA (US);
Erik M. Geidl, Bellevue, WA (US);
Donald D. Karlov, Woodinville, WA
(US); Jeffrey W. Pettiross, Seattle, WA
(US); Thomas R. Wick, Seattle, WA
(US)

(73) Assignee: Microsoft Corporation, Redmond, WA (US)

( * ) Notice: Subject to any disclaimer, the term of this patent is extended or adjusted under 35 U.S.C. 154(b) by 715 days.

This patent is subject to a terminal disclaimer.

(21) Appl. No.: 11/428,530

(22) Filed: Jul. 3, 2006

(65) Prior Publication Data

US 2006/0239561 A1    Oct. 26, 2006

Related U.S. Application Data

(63) Continuation of application No. 10/146,487, filed on May 14, 2002, now Pat. No. 7,096,432.

(51) Int. Cl.
*G06F 3/048* (2006.01)
(52) U.S. Cl. .................. 715/768; 715/776; 715/863
(58) Field of Classification Search ................ 715/768, 715/776, 863; 382/177–189, 309–311
See application file for complete search history.

(56) References Cited

U.S. PATENT DOCUMENTS

| 4,972,496 A | 11/1990 | Sklarew |
| 5,396,566 A | 3/1995 | Bruce et al. |
| 5,566,248 A | 10/1996 | Ulrich |
| 5,613,019 A | 3/1997 | Altman et al. |
| 5,633,957 A | 5/1997 | Robinson |
| 5,638,201 A | 6/1997 | Bos et al. |
| 5,638,501 A | 6/1997 | Gough et al. |

(Continued)

FOREIGN PATENT DOCUMENTS

JP    H08-016313    1/1996

(Continued)

OTHER PUBLICATIONS

EP Search Report dated Mar. 3, 2010 in EP Application No. 03007904.0.

(Continued)

*Primary Examiner*—Ba Huynh
(74) *Attorney, Agent, or Firm*—Woodcock Washburn LLP

(57) ABSTRACT

A transparent graphical user interface that overlays the user interfaces of other applications. The transparent user interface receives handwriting input and displays handwriting objects represented by handwriting input received in the area of the transparent handwriting interface. The transparent user interface of the invention can be expanded to include most of the display area of a computer, thereby allowing the user to write anywhere within the display area. This also allows the user to write multiple lines of text. Additionally, because the user interface is transparent, it allows the user to see the underlying graphical user interfaces for other applications, including applications that receive text recognized from the handwriting input written into the transparent handwriting interface. Further the transparent interface allows the user to interact with underlying graphical user interfaces.

33 Claims, 8 Drawing Sheets

U.S. PATENT DOCUMENTS

| | | | |
|---|---|---|---|
| 5,666,139 A | 9/1997 | Thielens et al. | |
| 5,675,665 A | 10/1997 | Lyon | |
| 5,682,439 A | 10/1997 | Beernink et al. | |
| 5,774,582 A | 6/1998 | Gat et al. | |
| 5,798,752 A | 8/1998 | Buxton et al. | |
| 5,812,697 A * | 9/1998 | Sakai et al. | 382/186 |
| 5,850,477 A * | 12/1998 | Takada | 382/186 |
| 5,862,256 A | 1/1999 | Zetts et al. | |
| 5,864,636 A * | 1/1999 | Chisaka | 382/189 |
| 5,867,150 A | 2/1999 | Bricklin et al. | |
| 5,883,622 A | 3/1999 | Chan et al. | |
| 5,893,126 A | 4/1999 | Drews et al. | |
| 6,035,064 A * | 3/2000 | Nakao et al. | 382/200 |
| 6,088,481 A * | 7/2000 | Okamoto et al. | 382/189 |
| 6,124,861 A | 9/2000 | Lebovitz et al. | |
| 6,128,007 A | 10/2000 | Seybold | |
| 6,144,380 A | 11/2000 | Shwarts et al. | |
| 6,212,299 B1 * | 4/2001 | Yuge | 382/231 |
| 6,269,187 B1 * | 7/2001 | Frink et al. | 382/187 |
| 6,317,128 B1 | 11/2001 | Harrison | |
| 6,340,967 B1 * | 1/2002 | Maxted | 345/179 |
| 6,396,502 B1 | 5/2002 | Cunniff | |
| 6,396,598 B1 | 5/2002 | Kashiwagi et al. | |
| 6,499,043 B1 | 12/2002 | Forcier | |
| 6,571,012 B1 | 5/2003 | Pettigrew | |
| 6,647,145 B1 | 11/2003 | Gay | |
| 6,727,929 B1 | 4/2004 | Bates et al. | |
| 7,096,432 B2 | 8/2006 | Huapaya et al. | |
| 7,120,319 B2 | 10/2006 | Danielson et al. | |
| 7,167,165 B2 | 1/2007 | Keely et al. | |
| 2002/0009226 A1 * | 1/2002 | Nakao et al. | 382/177 |
| 2002/0011990 A1 | 1/2002 | Anwar | |
| 2002/0044152 A1 | 4/2002 | Abbott et al. | |
| 2003/0001899 A1 | 1/2003 | Partanen et al. | |
| 2003/0071850 A1 * | 4/2003 | Geidl | 345/781 |
| 2003/0142112 A1 | 7/2003 | Saund et al. | |
| 2003/0152268 A1 | 8/2003 | Seto et al. | |
| 2005/0025363 A1 | 2/2005 | Lui et al. | |
| 2007/0097102 A1 | 5/2007 | Keely et al. | |

FOREIGN PATENT DOCUMENTS

JP        H11-249782        9/1999

OTHER PUBLICATIONS

JP Rejection dated Nov. 14, 2008 in JP Application No. 2003-103442.
U.S. Appl. No. 10/146,487: Notice of Allowance dated Apr. 7, 2006.
U.S. Appl. No. 10/146,487: Non-Final Rejection dated Dec. 7, 2005.
U.S. Appl. No. 10/146,487: Non-Final Rejection dated Mar. 2, 2005.
U.S. Appl. No. 10/284,471: Non-Final Rejection dated Dec. 23, 2005.
U.S. Appl. No. 10/284,471: Final Rejection dated Jun. 14, 2006.
U.S. Appl. No. 10/284,471: Advisory Action dated Sep. 12, 2006.
U.S. Appl. No. 10/284,471: Notice of Allowance dated Oct. 31, 2006.
U.S. Appl. No. 11/610,820: Final Rejection dated Jan. 20, 2010.
U.S. Appl. No. 11/610,820: Non-Final Rejection dated Aug. 28, 2009.
EP Search Report dtd Jan. 2, 2007, EP Appln. 03007904.0-1245.
EP Search Report dtd Jan. 2, 2007, EP Appln. 03007904.0 - 1245.

* cited by examiner

WRITE ANYWHERE TOOL

This application is a continuation of U.S. patent Ser. No. 10/146,487 entitled "Write Anywhere Tool," filed on May 14, 2002 and naming Luis M. Huapaya et al. as inventors, which application is incorporated entirely herein by reference.

FIELD OF THE INVENTION

The present invention relates to a user interface that allows a user to write handwriting input nearly anywhere over the work area of a display screen. More particularly, the present invention relates to a transparent user interface that overlays other user interfaces. Thus, the present invention allows the user to simultaneously use a pointing device to interact with system applications as well as write handwriting input anywhere over the work area to, for example, input text.

BACKGROUND OF THE INVENTION

As computers become more and more integrated into our modern society, there is a growing need for tools that will allow a user to efficiently enter data into a computer. Some of the most desired input tools are those that allow a user to enter data using natural input techniques rather than typing on a physical or software QWERTY keyboard. These natural input techniques, which include handwriting, offer users the promise of a familiar and convenient method of creating data that requires no special skills. To this end, great strides have been made in developing applications that recognize text and commands from handwriting input.

Conventional special-purpose handwriting input interfaces appear as relatively small-sized windows, which provide just enough space to allow the user to write a few words of text. These conventional handwriting input interfaces are separate and typically distanced from the applications into which the recognized text is to be inserted. Alternately, some conventional handwriting input interfaces are integral with a single application, and cannot be used to input handwriting data to other applications.

These conventional special-purpose handwriting input interfaces have several disadvantages. First, as previously noted, they typically allow a user to write only a few words of handwriting input. If the user wishes to add more handwriting input, he or she must wait until the initial handwriting input has been recognized and cleared from the interface. Second, unless the user interface is located next to the application in which the recognized text is being inserted, a user must constantly move the pointer (that is the pen or stylus) being used to create the handwriting input between the user interface and the application receiving the text recognized from the handwriting input. Thus, the user's attention must constantly shift between the application and the handwriting input interface. Alternately, if the user places the handwriting input interface close to the application so as to avoid having to continuously shift his or her attention, as the amount of handwriting input grows, the recognized text will become obscured by the handwriting interface.

Accordingly, there is a need for a handwriting input interface that will allow a user to create large amounts of handwriting input at one time. Further, there is also a need for a handwriting input interface that will allow a user to write handwriting input without shifting his or her attention from the application receiving the recognized handwriting input, and yet will not obscure the recognized handwriting input within the application.

SUMMARY OF THE INVENTION

Advantageously, the write anywhere tool according to the invention provides a transparent graphical user interface that overlays the user interfaces of other applications, and displays ink objects represented by handwriting input received in the area of the transparent user interface. The transparent user interface of the invention can be expanded to include most of the display area of a computer, thereby allowing the user to write anywhere within the display area. This also allows the user to write multiple lines of text. Additionally, because the user interface is transparent, it allows the user to see the underlying graphical user interfaces for other applications, including applications that receive text recognized from handwriting input written into the transparent user interface. Thus, a user can write handwriting input adjacent to an insertion point in an underlying user interface while still simultaneously maintaining his or her focus on both the transparent user interface and the underlying user interface. Moreover, a user can interact with the underlying user interface without hiding the transparent user interface.

BRIEF DESCRIPTION OF THE DRAWINGS

The foregoing summary of the invention, as well as the following detailed description of preferred embodiments, will be better understood when read in conjunction with the accompanying drawings.

DETAILED DESCRIPTION OF PREFERRED EMBODIMENTS

Overview

The present invention relates to a tool that provides a transparent user interface for receiving and displaying handwriting input without obscuring underlying user interfaces. A write anywhere tool according to the invention may be implemented with instructions that can be executed on a computing device. Accordingly, an exemplary computing environment for executing such instructions will be described. Various interfaces demonstrating the operation and use of the invention will also be described, along with the components and functions of a write anywhere tool according to the invention.

Exemplary Operating Environment

As previously noted, the write anywhere tool of the invention may be implemented using software. That is, the write anywhere may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Figure 1:
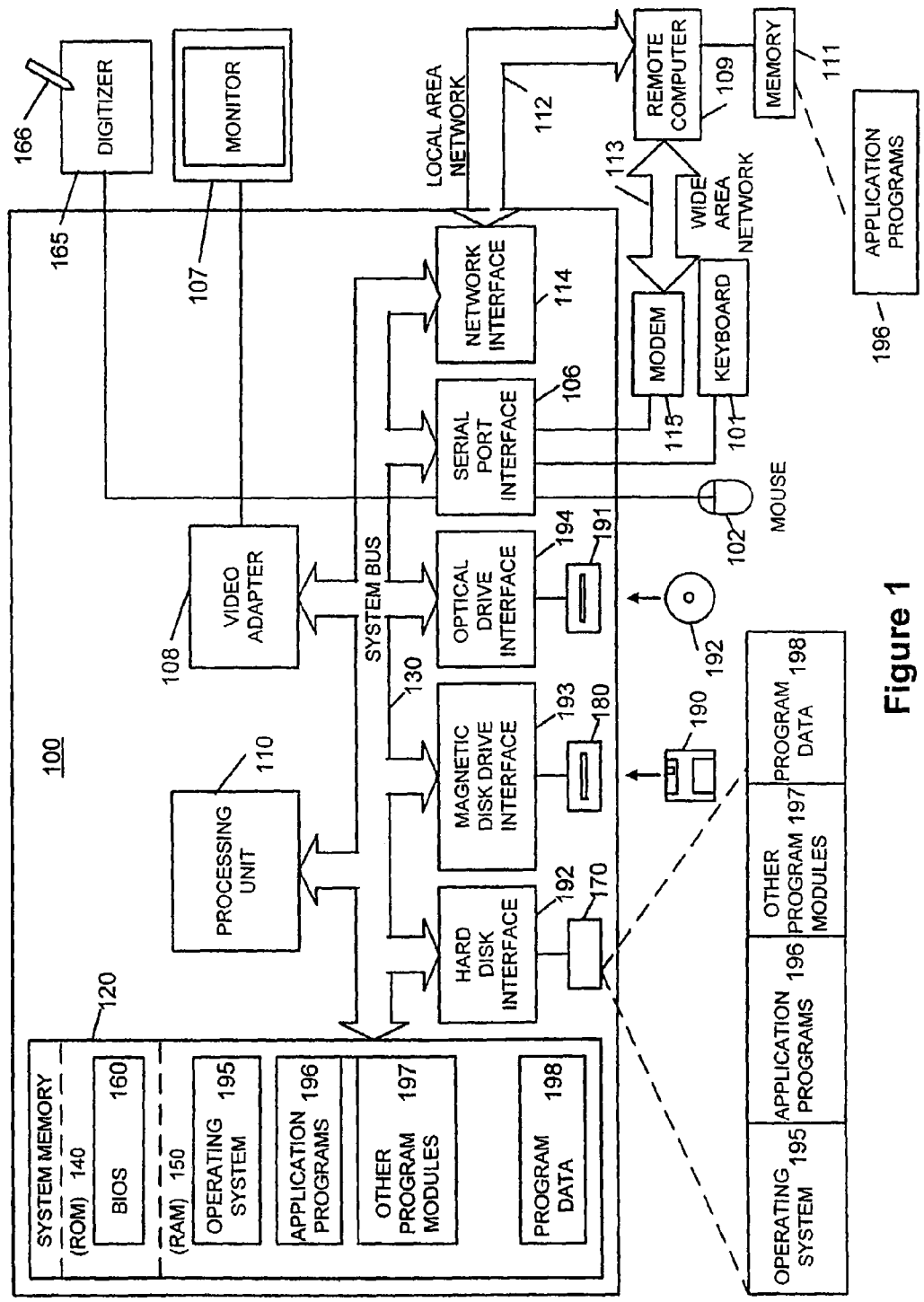
FIG. 1 shows a schematic diagram of a general-purpose digital computing environment that can be used to implement various aspects of the invention.

Because the invention may be implemented using software, it may be helpful for a better understanding of the invention to briefly discuss the components and operation of a typical programmable computer on which various embodiments of the invention may be employed. Such an exemplary computer system is illustrated in FIG. 1. The system includes a general-purpose computer 100. This computer 100 may take the form of a conventional personal digital assistant, a tablet, desktop or laptop personal computer, network server or the like.

Computer 100 typically includes at least some form of computer readable media. Computer readable media can be any available media that can be accessed by the computer 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 100 typically includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150. A basic input/output system 160 (BIOS), containing the basic routines that help to transfer information between elements within the computer 100, such as during start-up, is stored in the ROM 140.

The computer 100 may further include additional computer storage media devices, such as a hard disk drive 170 for reading from and writing to a hard disk, a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment. Also, it should be appreciated that more portable embodiments of the computer 100, such as a tablet personal computer or personal digital assistant, may omit one or more of the computer storage media devices discussed above.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through various input devices, such as a keyboard 101 and a pointing device 102 (for example, a mouse, touchpad, or pointing stick). As previously noted, the invention is directed to a write anywhere tool for receiving and displaying handwriting input. As will be appreciated by those of ordinary skill in the art, while handwriting input can be generated using a variety of pointing devices, the most convenient pointing device for creating handwriting input is a pen. Accordingly, the computing device 120 will typically include a digitizer 165 and a stylus or pen 166, which a user may employ to create handwriting input. The digitizer 165 receives handwriting input when the stylus or pen 166 contacts the surface of the digitizer 165. The computer 100 may also have additional input devices, such as a joystick, game pad, satellite dish, scanner, touch screen, or the like.

These and other input devices often are connected to the processing unit 110 through a serial port interface 106 that is coupled to the system bus 130, but may be connected by other interfaces, such as a parallel port, game port, IEEE-1394B bus, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As will be appreciated by those of ordinary skill in the art, the monitor 107 may incorporate the digitizer 165. This arrangement conveniently allows a user to employ the pen 166 to point directly to objects displayed on the monitor 107 by contacting the display screen of the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN)

113. Such networking environments are commonplace in offices, enterprise-wide computer networks, intranets, and the Internet, and thus will not be explained in detail here.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, may be connected to the system bus 130 via the serial port interface 106. In a networked environment, program modules depicted relative to the personal computer 100, or portions thereof, may be stored in a remote memory storage device. Of course, it will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

The Transparent Ink Overlay Interface

Figure 2:
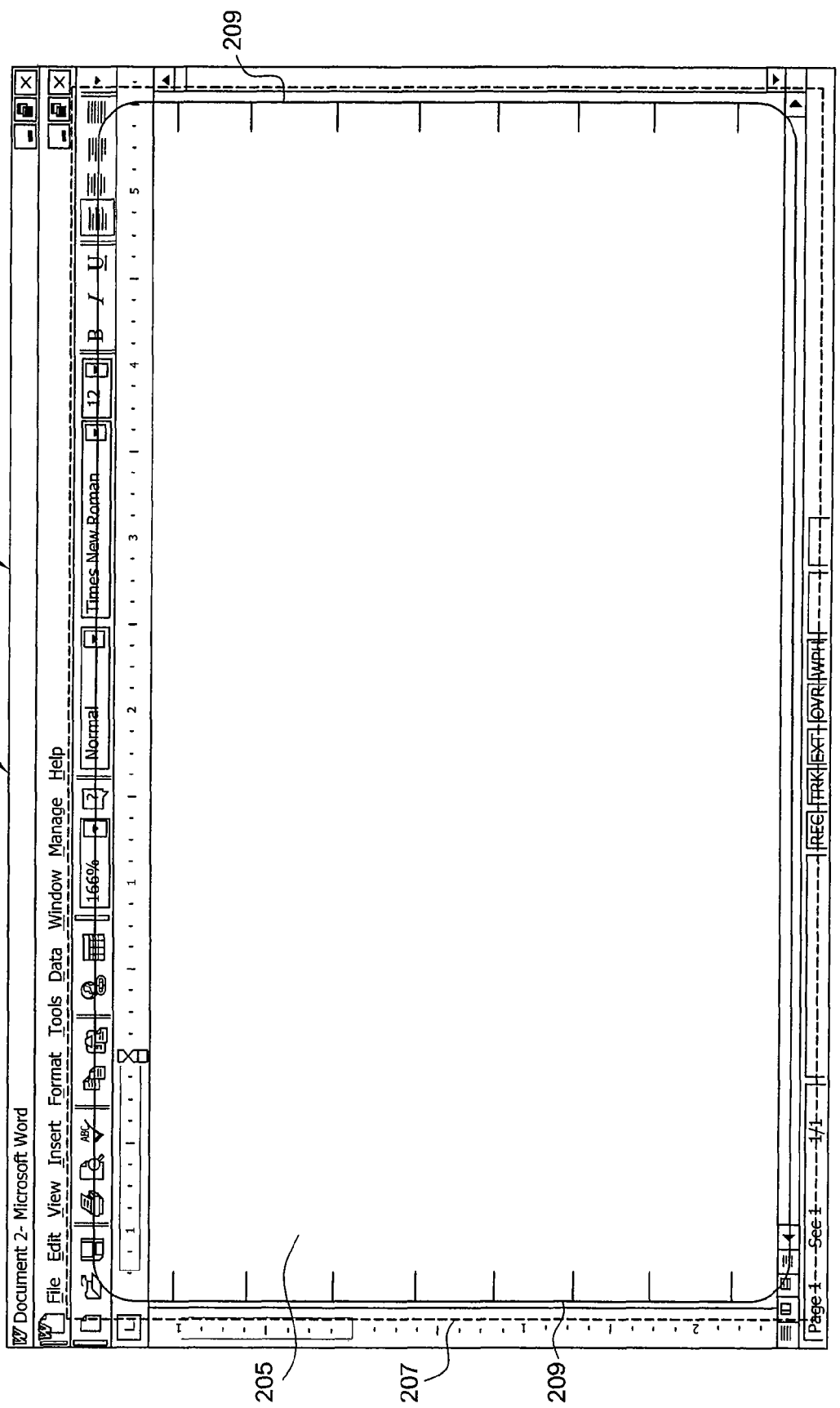
FIG. 2 illustrates a handwriting user interface according to one embodiment of the invention before receiving handwriting input.

FIG. 2 illustrates a display area 201 provided by the monitor of the computer. In the illustrated embodiment, the display area 201 is coextensive with the digitizer 165. Thus, the user can create handwriting input for the computer by contacting a pen or stylus 166 against the surface of the display area 201. As shown in this figure, the display area 201 displays a graphical user interface 203 for the Microsoft Word word-processing software application. The display also contains a transparent user interface 205 overlaying most of the Word user interface 203 (hereafter referred to as the underlying user interface for simplicity).

Because the user interface 205 is transparent, it cannot clearly be seen in FIG. 2. However, the dotted lines 207 are used in this figure to represent where the boundaries of the user interface 205 exist. In the illustrated embodiment, the transparent user interface 205 overlays a substantial portion of the display area 201. As will be explained in detail below, when the user creates handwriting input over the portion of the display corresponding to the transparent user interface 205, handwriting objects represented by the handwriting input will be displayed in the transparent user interface 205 prior to the handwriting input's recognition. Once the handwriting input has been recognized, the text recognized from the handwriting input is displayed in the underlying user interface 203 (that is, the user interface for the Microsoft Word word-processing software application, which will occasionally be referred to as the underlying application for simplicity), and deleted from the transparent user interface 205.

As may be seen from FIG. 2, the transparent user interface 205 is not a conventional windows-type user interface as typically employed by the Microsoft Windows operating system or the Macintosh operating system. That is, the transparent user interface 205 does not contain borders or toolbars as with conventional windows-type user interfaces. Instead, the transparent user interface 205 displays margin lines 209 defining the handwriting area of the display area 201 for which the transparent user interface 205 will accept handwriting input. The margins may be drawn, for example, in gray with a 50% dither. Alternately, alpha blending may be used to display the margin lines 209, but the use of dither will reduce power consumption as will be appreciated by those of ordinary skill in the art. Of course, those of ordinary skill in the art will also appreciate that the transparent user interface 205 can be modified to include borders or toolbars as desired.

Figure 3:
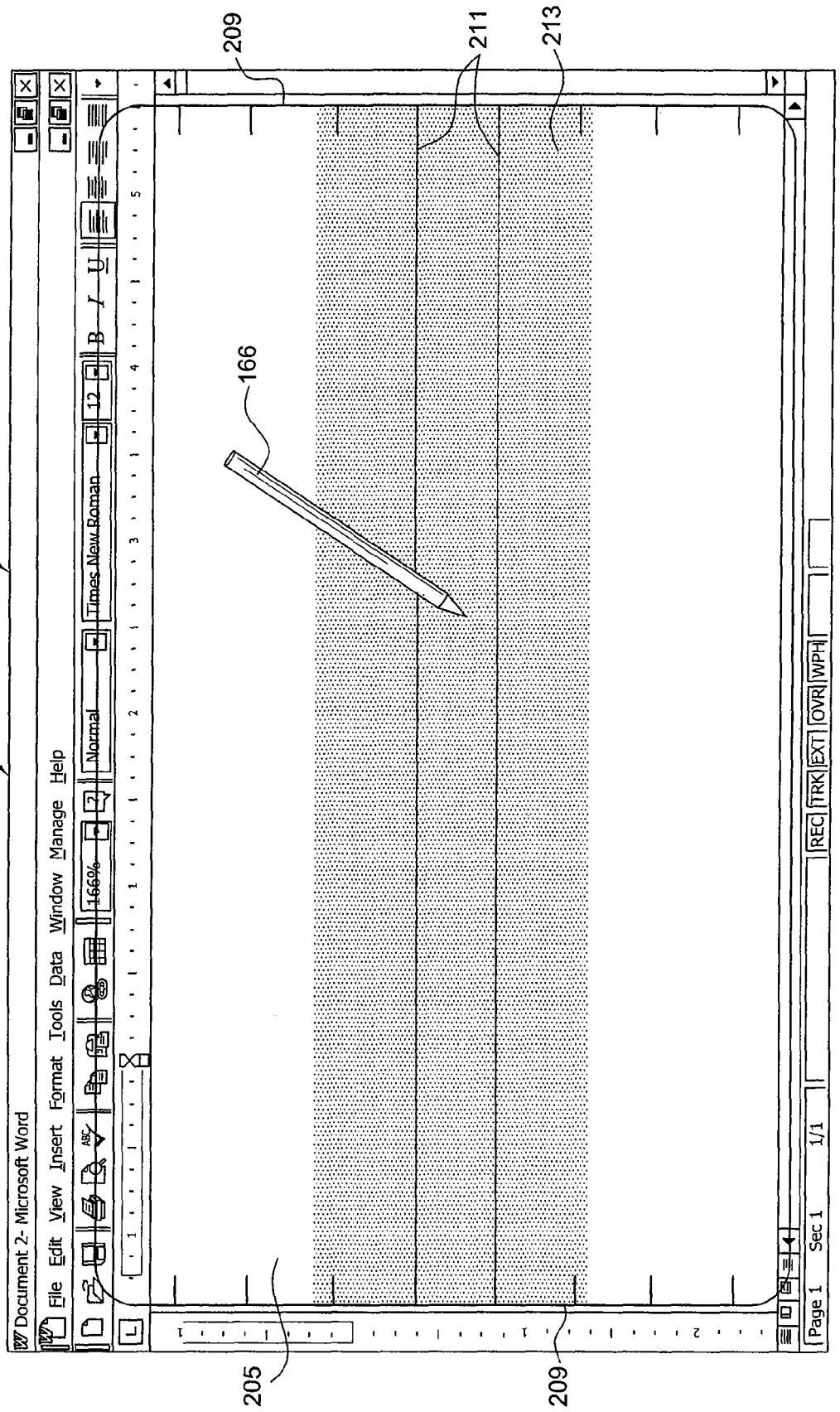
FIG. 3 illustrates the handwriting user interface shown in FIG. 2 when contacted by a pen or stylus.

To create handwriting input, the user contacts the pen 166 with the display area 201 as shown in FIG. 3. In response to movement of the pen 166 toward the handwriting area of the transparent user interface 205, the transparent user interface 205 also displays handwriting guidelines 211. These guidelines 211 extend from one margin line to the opposite margin line, and assist the user in writing level handwriting input. As will be appreciated by those of ordinary skill the art, the more level the user's handwriting, the more accurately that the handwriting input will be recognized. Thus, the guidelines 211 help improve the recognition accuracy for the user's handwriting input.

Figure 4:
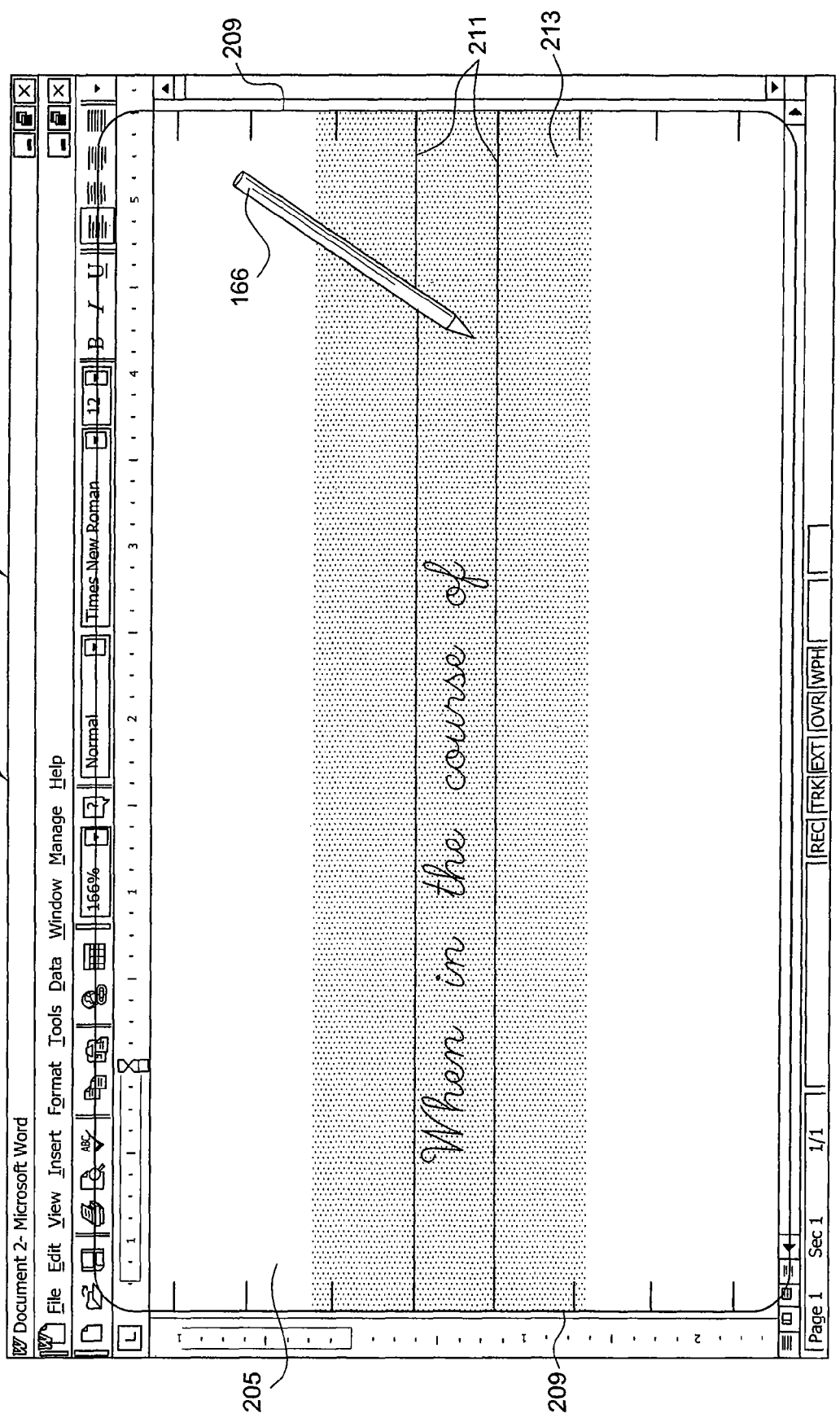
FIG. 4 illustrates the handwriting user interface shown in FIG. 2 after receiving one line of handwriting input.

The guidelines 211 also serve to provide feedback to the user as to the operational status of the transparent user interface 205. More particularly, the guidelines 211 are only displayed by the transparent user interface 205 when the transparent user interface 205 is prepared to accept handwriting input. Thus, the guidelines 211 are not displayed when focus has shifted from the transparent user interface 205 to another user interface, such as the underlying user interface 203. Further, the guidelines 211 will not be displayed when the pen 166 has moved outside of the boundary formed by the margin lines 209, or when the pen 166 has moved beyond a threshold height from the surface of the display area 201. FIG. 4 illustrates the transparent user interface 205 after the user has employed the pen 166 to write handwriting input. As seen in this figure, the transparent user interface 205 displays handwriting ink objects corresponding to the handwriting input. By maintaining the handwriting input between the guidelines 211, the handwriting input is kept level and thus may be more accurately recognized.

Figure 5:
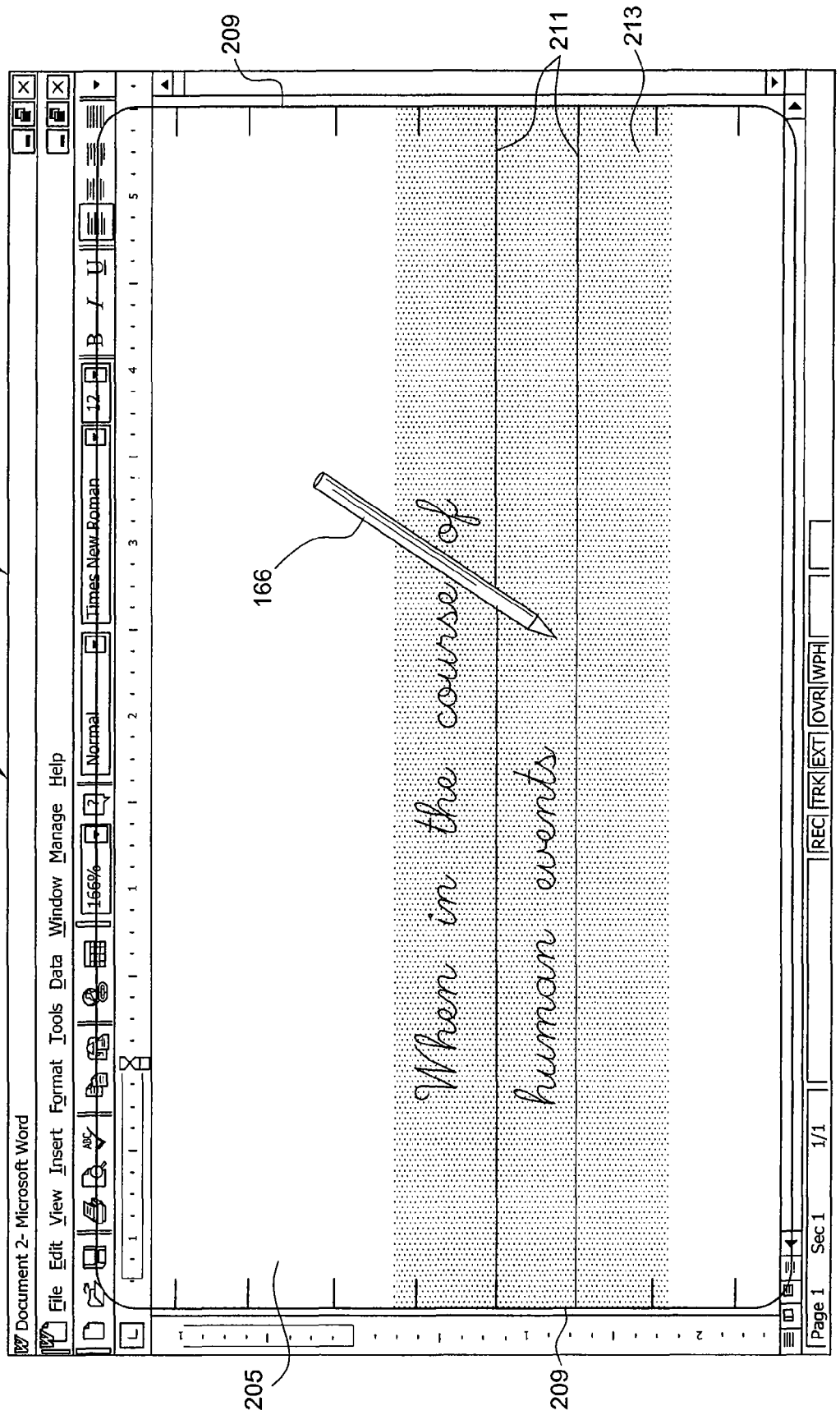
FIG. 5 illustrates the handwriting user interface shown FIG. 2 after receiving two lines of handwriting input.

When the user begins to write another line of text as shown FIG. 5, the position of the guidelines 211 changes to match the new line of text. In the illustrated embodiment, the guidelines 211 snap to only fixed positions in the transparent user interface 205. Of course, other embodiments of the invention may allow the guidelines 211 to reposition at any suitable location in the transparent user interface 205.

In order to better correspond with the writing intentions of the user, the position of the guidelines 211 depends on the context of the pen 166. Once the user contacts the pen 166 to the screen, the guidelines 211 are fixed in place. This is convenient when, for example, a user's handwriting includes letters that extend above or below the guidelines 211. Thus, after contacting the handwriting area, the user may move the pen 166 anywhere within the handwriting area, and the position of the guidelines 211 will remain the same.

Even if the pen 166 is lifted from the surface of the handwriting area, the guidelines 211 will remain in position for a threshold amount of time, depending upon the location of the pen 166. This allows a user to briefly lift the pen 166 from the handwriting area when writing, and continue writing a line without movement of the guidelines 211. If, however, the user lifts and moves the pen 166 a threshold distance from its previous contact point, then the position of the guidelines 211 will automatically move to match the new position of the pen 166.

With some embodiments of the invention, the direction in which the pen 166 is moved will determine the threshold time before the guidelines 211 are repositioned. For example, if the user moves the pen 166 to a position above the line currently being written, then the guidelines 211 may remain fixed for a longer period of time than if the pen 166 is moved to a position below the line currently being written, even if the distances to the two positions are the same. As known to those of ordinary skill in the art, some digitizers provide a hovering feature, which allows the digitizer to detect the position of the pen 166 when it is above the surface of the digitizer. This hovering feature can be used to detect when the pen 166 approaches the handwriting area to initially display the guidelines. It also can be employed to more quickly determine the direction in which a user is moving the pen 166, in order to better determine the threshold time for which the guidelines 211 will remain fixed before being repositioned at a new location.

As may also be seen in FIGS. 3 and 4, the embodiment of the transparent user interface 205 provides a rectangular translucent area 213 surrounding the position of the pen 166. The transparent user interface 205 provides this translucent area 213 in order to allow the user to better read the handwriting objects corresponding to his or her handwriting input without being distracted by the underlying graphical user interface. This translucent area 213 may be created by, for example, alpha blending the transparent user interface 205. The translucent area 213 may be sufficiently high to include the line of handwriting input currently being written by the user, as well as a small distance above and below the lines immediately above and below the line of handwriting input currently being written. Of course, other embodiments of the invention may vary the size, shape and appearance of the rectangular translucent area 213, or omit displaying it altogether.

Figure 6:
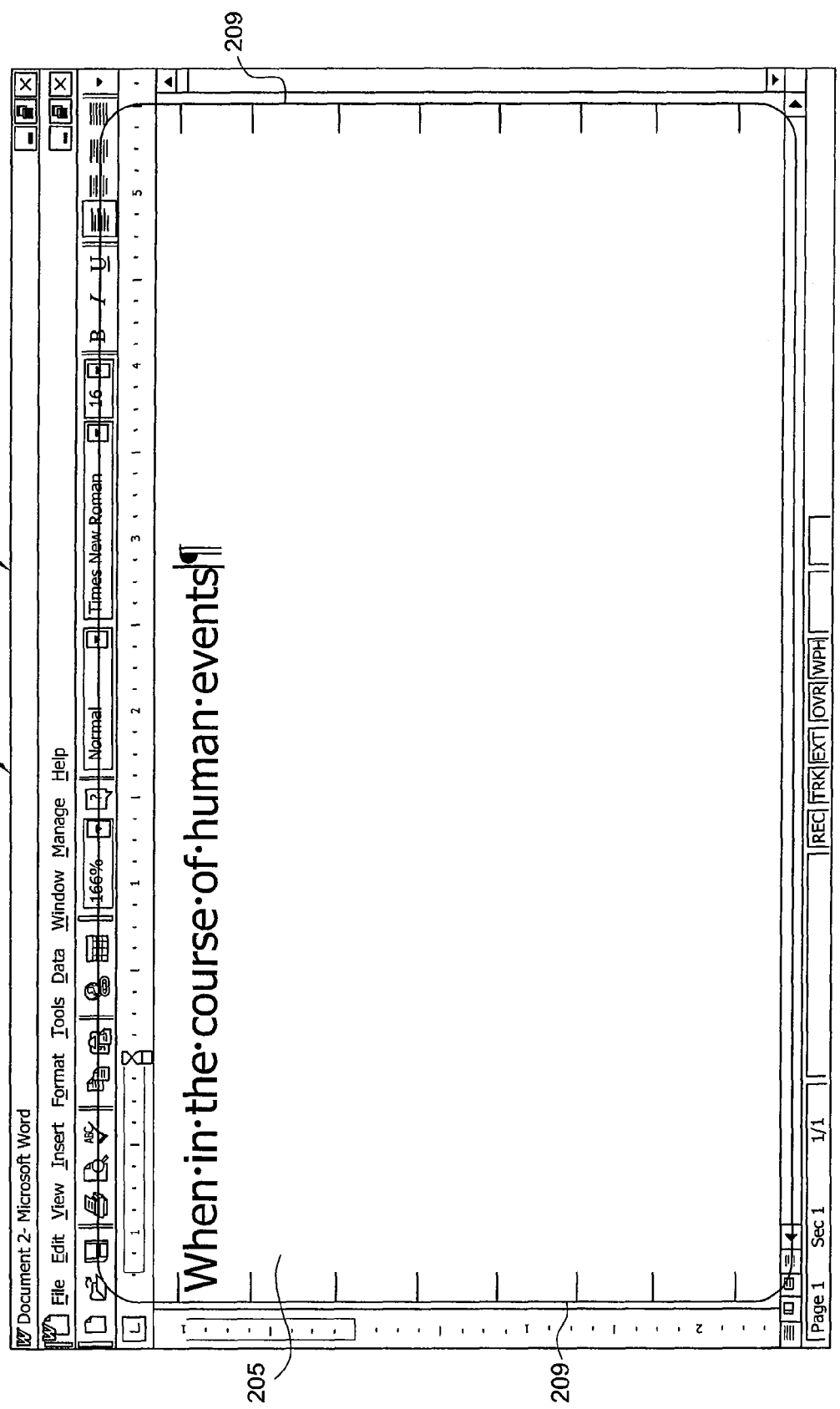
FIG. 6 illustrates the handwriting user interface shown in FIG. 5 after an underlying user interface has received text recognized from the two lines of handwriting input.

The handwriting objects corresponding to the handwriting input are displayed in the transparent user interface 205 until the handwriting input is recognized. These handwriting objects will continue to be displayed even if focus shifts from the transparent user interface 205 to another user interface, such as the underlying user interface 203. The recognition of the handwriting input may occur after a timeout period, or may occur upon instruction by the user. When the handwriting input is recognized, it is inserted at an insertion point in the user interface underlying the transparent user interface 205. Thus, as shown in FIG. 6, the text recognized from the handwriting input is displayed in the Microsoft Word user interface, and the corresponding handwriting objects are deleted from a transparent user interface 205. Thus, the transparent user interface 205 of the invention provides a convenient technique for allowing the user to provide handwriting input to an underlying application while still being able to simultaneously view both the user interface for the underlying application and the handwriting objects corresponding to the handwriting input.

Some embodiments of the invention may be employed to translate Asian language writing. With these embodiments, the guidelines 211 will appear as boxes, rather than straight lines. Further, the transparent user interface 205 may display graphical objects for correcting the handwriting translation before the recognized handwriting translation is delivered to an underlying application.

Of course, those of ordinary skill in the art will appreciate that the transparent user interface 205 may include various graphical objects as desired. For example, as previously noted, some embodiments of the transparent user interface 205 may include borders or toolbars. Still further, some embodiments of the transparent user interface 205 may include graphical objects for modifying the appearance of the handwriting objects, hiding the transparent user interface 205, or for performing other functions.

Punch Through Techniques

As will be appreciated by those of ordinary skill in the art, there will be occasions when a user wishes to have pointer input created with the pen 166 treated as input to an underlying user interface 203 rather than as handwriting input to the transparent user interface 205. For example, the user may wish to select text that has already been recognized and displayed in the underlying user interface 203, or activate buttons or menu selections in the underlying user interface 203. In these situations, the transparent user interface 205 must distinguish between pointer input that is handwriting input for the transparent user interface 205 and other input to the underlying user interface 203. Advantageously, the transparent user interface 205 of the invention provides a number of techniques for allowing pointer input to be passed through to an underlying user interface 203.

One such technique is referred to as the "quick tap" technique. With this technique, a quick tap of the pen 166 in the handwriting area when the transparent user interface 205 is not displaying handwriting objects will be treated as input to an underlying user interface 203. More particularly, if the transparent user interface 205 is not displaying handwriting objects, and the handwriting area receives a tap from the pen 166 at a location on the display that also corresponds to an underlying user interface 203, that pointer input will be treated as input for the underlying user interface 203 rather than as handwriting input for the transparent user interface 205.

A combination of factors will determine when a pen tap will be considered point input for the underlying user interface 203 rather than handwriting input for the transparent user interface 205. The first factor that determines when a pen tap will be considered pointer input for the underlying user interface 203 is the amount of time between the initial contact of the pen 166 with the handwriting area and when the pen 166 is lifted from the handwriting area. A prolonged contact of the pen 166 with the handwriting area beyond a threshold time will be considered the beginning of a pen stroke to create handwriting input, rather than a single pen tap to provide input to an underlying user interface 203.

Another factor that determines when a pen tap will be considered pointer input for the underlying user interface 203 is the distance that the pen 166 travels over the handwriting area during the duration of its contact. If movement of the pen 166 is confined to a small area around its initial contact point, then the pen tap will be considered an attempt to provide pointer input to the underlying application. On the other hand, if the pen 166 travels more than a threshold distance from its initial contact point while contacting the handwriting area, then the pointer input will be considered handwriting input rather than a single tap of the pen 166.

Still another factor, as previously noted, is the context in which the tap is received. If the transparent user interface 205 is not displaying any handwriting objects, then it is unlikely that the user is attempting to create a single point handwriting object in an empty interface. Instead, the transparent user interface 205 will recognize that the tap is more likely intended to be pointer input to the underlying user interface 203 below the position of the tap. Of course, those of ordinary skill in the art will appreciate that some embodiments of the invention may only require that handwriting objects not be present within a threshold distance of the pen tap to recognize a quick pen tap, rather than requiring that the transparent user interface 205 contain no handwriting objects whatsoever. For example, some embodiments of the invention may recognize a quick pen tap if no handwriting objects are displayed within two inches of the pen's contact point.

Similarly, the location of the pen tap relative to objects in an underlying user interface 203 may also be considered in distinguishing pointer input for the underlying user interface 203 from handwriting input for the transparent user interface 205. For example, if the pen tap is received directly above a button or menu selection in the underlying user interface 203, then the transparent user interface 205 may relax the time and distance threshold's necessary to recognize the pen tap as pointer input to the underlying user interface 203 rather than handwriting input to the transparent user interface 205. By the same token, if there are no graphical objects in the underlying user interface 203 directly below the pen tap, then the transparent user interface 205 may decrease the time or distance thresholds, making the transparent user interface 205 more likely to treat the pen tap as handwriting input rather than pointer input to the underlying user interface 203.

Of course, those of ordinary skill in the art will appreciate that still other methods and criteria may be employed to distinguish a quick tap from handwriting input. For example, the write anywhere tool may use a trainable system, such as a neural network or a statistical determination system, to distinguish a quick tap for punching point input through to the underlying user interface from handwriting input to the transparent user interface 205.

Another technique for passing pointer input through to an underlying application is the hold through technique. According to this technique, if the user holds the pen 166 still in a single location for an inordinate amount time, the transparent user interface 205 will recognize that the user is trying to submit pointer input to the underlying user interface 203 rather than trying to create handwriting input. Of course, those of ordinary skill in the art will appreciate that it is virtually impossible for a user to hold a pen 166 perfectly still against the surface of a digitizing display.

Accordingly, in determining whether a user is employing the hold-through technique, the transparent user interface 205 will consider the total amount of time during which the pen 166 was positioned at the location and the distance that the pen 166 traveled from that initial location to determine whether the pointer input should be treated as handwriting input or input for an underlying application. For example, each time that the pen 166 moves to a new location, the transparent interface 205 may begin a counter to determine if the pen 166 remains within a threshold distance of that location for a threshold time. Thus, the pen 166 may wobble or move slightly from the location, but the transparent interface 205 will still register a hold-through command if the pen 166 does not move beyond the threshold distance from the location within the threshold amount of time. Alternate embodiments of the invention may even allow the pen 166 to move beyond the threshold distance for very short periods of time, as long as the pen 166 quickly returns to within the threshold distance from the initial location.

Similarly, the transparent user interface 205 may also consider the context of the pointer input in determining whether is should be treated as handwriting input or input for an underlying user interface 203. For example, if the pen 166 is held in a single location that corresponds to a button or menu selection in an underlying user interface 203, then the transparent user interface 205 will be more likely to treat the pointer input as input to that underlying interface. For example, the transparent user interface may relax the threshold time, the threshold distance, or both in determining whether the user is employing the hold-through technique. Alternately, if the pen 166 is held in a single location that does not correspond to a graphical object in an underlying user interface 203, then the transparent user interface 205 will be more likely to treat the pointer input as handwriting input.

Advantageously, once a portion of the pointer input is determined to be input for an underlying user interface 203, all of the pointer input is treated as input for the underlying user interface 203 rather than as handwriting. Thus, after a user has held the pen 166 in a single location sufficiently long to establish hold through of the pointer input to the underlying user interface 203, all of the subsequent pointer input obtained before the pen 166 is lifted from the writing area is treated as input for the underlying user interface 203 rather than as handwriting. This conveniently allows the user to hold through to an underlying user interface 203, and then subsequently move a graphical object (or select multiple graphical objects) by then moving the pen 166 without lifting the pen 166 from the handwriting area.

Likewise, the pointer input received before the user holds the pen 166 in a single location sufficiently long to establish hold through will also be treated as input to the underlying user interface 203 rather than handwriting input. For example, a user may move the pen 166 across the handwriting area. This initial pointer input from the pen 166 will be treated as handwriting input, and the transparent interface will display handwriting objects corresponding to this handwriting input. If the user then holds the pen 166 stationary beyond the threshold amount of time, without lifting the pen 166 from the handwriting area, all of the pointer input previously recognized as handwriting input will be treated as pointer input for an underlying user interface 203. The handwriting object corresponding to this pointer input will be deleted. The actions corresponding to the pointer input will be taken in the appropriate underlying user interface 203 (that is, the user interface underlying the pointer input). Thus, if a user inadvertently moves the pen 166 intending to drag a graphical object (or select multiple graphical objects) in an underlying user interface 203 before changing focus to the underlying user interface 203, the user can still employ the pointer input for the intended purpose simply by holding the pen 166 in place at its destination.

Still another technique for passing through pointer input to an underlying user interface 203 is the recognition of gestures. As will be appreciated by those of ordinary skill in the art, some handwriting recognition processes will recognize specific arrangements of handwriting input strokes as commands rather than as text. These specific handwriting input strokes are commonly referred to as gestures. For example, the transparent user interface 205 according to the invention may recognize specific combinations of handwriting strokes as gestures for the commands space, backspace, and tap (that is, activation of a control function, such as when a user depresses a button on a mouse). Of course, the transparent user interface 205 can be modified to recognize additional or alternate gestures.

The transparent user interface 205 may recognize some gestures as being specific to the transparent user interface 205, and recognize other gestures as being specific to an underlying application. Alternately, or additionally, the transparent user interface 205 may employ heuristics to determine whether a gesture is intended as input for the transparent user interface 205 or for an underlying user interface 203. For example, the transparent user interface 205 may recognize a scratch-out gesture as a command to delete the text indicated by the gesture. If the scratch-out a gesture is received in a portion of the transparent user interface 205 containing handwriting objects, then the transparent user interface 205 will treat the scratch-out gesture as input to the transparent user interface 205, and delete the indicated handwriting objects and associated handwriting input.

Alternately, if the scratch-out gesture is received at a location in the handwriting area that does not contain handwriting objects, then the scratch-out gesture will be passed to the underlying user interface 203 containing the insertion point.

The scratch-out gesture may then be applied to delete previously recognized text from the underlying user interface 203. Still further, if the scratch-out gesture is received at a location in the handwriting area that recently contained handwriting objects, then the scratch-out gesture will be passed to the underlying user interface 203 that received the recognized handwriting input corresponding to the handwriting objects. Moreover, the handwriting gesture may then be used to delete the recognized text.

In addition to recognizing gestures, the transparent user interface 205 may employ heuristics to distinguish a pointer input intended by the user as handwriting input from pointer input intended by the user as input for an underlying user interface 203. For example, these heuristics may identify characteristics unique to pointer input intended for use as handwriting input, and treat pointer input that is not contain these characteristics as input for an underlying user interface 203. Alternately, these heuristics may identify characteristics unique to pointer input intended for use as input to an underlying user interface 203, entry to all pointer input that does not contain these characteristics as handwriting input.

Another technique that the transparent user interface 205 of the invention may employ to pass through pointer input to an underlying user interface 203 is the designation of that underlying user interface 203 as an excluded window. More particularly, the transparent user interface 205 may allow a user or software applications to designate specific user interfaces as excluded windows. When the transparent user interface 205 receives pointer input at a position corresponding to an excluded window, it will not treat the pointer input as handwriting. Instead, the transparent user interface 205 will automatically consider the pointer input to be input for the underlying excluded window, and provide that pointer input to the underlying user interface 203. Thus, handwriting input cannot be written over an excluded window, and handwriting objects will not be displayed over an excluded window. With some embodiments of the invention, however, handwriting that begins in a portion of the handwriting area that is not over an excluded window may be continued over an excluded window, in order to allow the user continuity in writing.

Examples of such excluded windows may include, for example, scroll bars. Designating a scroll bar as an excluded window conveniently allows a user to scroll through an underlying application without having to create pointer input that corresponds to a quick tap or a hold through technique. Another type of user interface that may be designated as excluded windows are correction user interfaces for correcting inaccurately recognized text. Some embodiments of the invention may allow only the user to designate user interfaces as excluded windows, while other embodiments of the invention may allow only outside software applications to designate user interfaces as excluded windows. Of course, still other embodiments of the invention may allow both the user and outside software applications to designate user interfaces as excluded windows.

The Write Anywhere Tool

Figure 7:
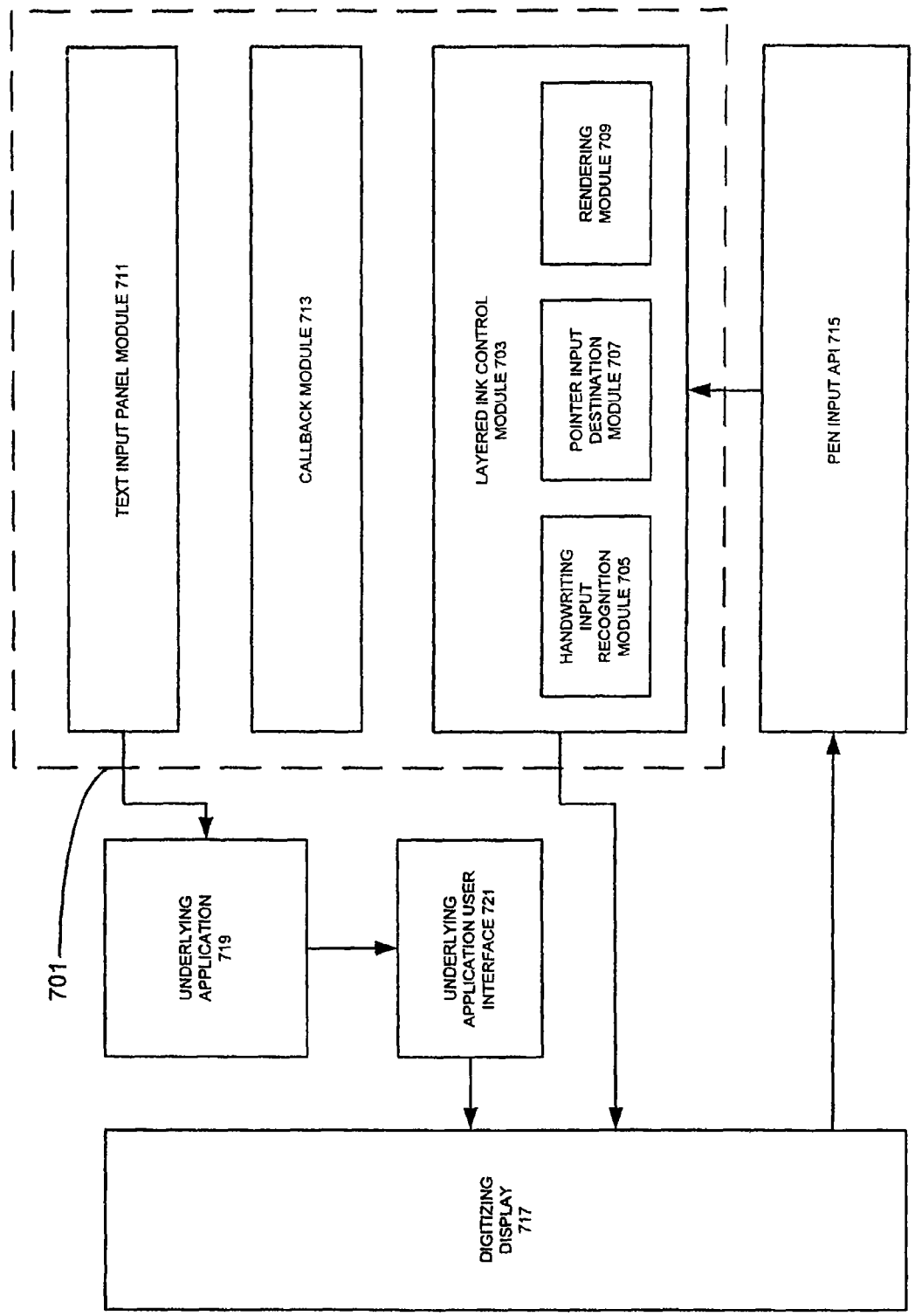
FIG. 7 illustrates is a block diagram showing components of a write anywhere tool according to one embodiment of the invention.

FIG. 7 illustrates a write anywhere tool that implements the transparent user interface 205 of the invention described above. As seen in this figure, the write anywhere tool 701 includes a layered ink control module 703. As will be discussed in detail below, the layered ink control module 703 contains a handwriting input recognition module 705, a pointer input destination module 707, and a rendering module 709, which displays the margin lines 209, the guidelines 211, and handwriting objects corresponding to handwriting input. The write anywhere tool 701 is hosted by a text input panel module 711. As will also be described in detail below, the purpose of the text input panel module 711 is to provide a number of data input options to a user, including use of the transparent user interface 205 of the invention. A callback module 713 then conveys data from the layered ink control module 703 to the rendering module 709.

In addition to the components of the write anywhere tool 701, FIG. 7 also illustrates a pen input application program interface (API) 715 and a digitizing display 717. As will be known to those of ordinary skill in the art, the pen input API 715 receives the pointer input created when a pen or stylus 166 contacts the digitizing display 717. The pen input API 715 then conveys the received pointer input to the layered ink control module 703 of the write anywhere tool 701. In addition to providing pen input to the pen input API 715, the digitizing display 717 receives and displays data from the rendering module 709 and the underlying application user interface. As previously noted, the digitizing display 717 combines a monitor display with a digitizer 165, so that the user may conveniently point to displayed graphical objects simply by contacting a pen or stylus 166 against the surface of the digitizing display 717. As will be appreciated by those of ordinary skill in the art, however, with other embodiments of the invention the digitizer 165 can be implemented separately from the display.

FIG. 7 also illustrates an underlying application, along with its associated underlying application user interface. As described above, an underlying user interface 203 is an interface that is displayed below the transparent input panel of the invention. The underlying application is then the software application that hosts the underlying user interface 203. While FIG. 7 illustrates only a single underlying application and associated underlying application user interface, the transparent user interface 205 of the invention may overlay a number of different underlying user interfaces 203. These underlying user interfaces 203 may be hosted by a single underlying software application, or by multiple underlying software applications.

Figure 8:
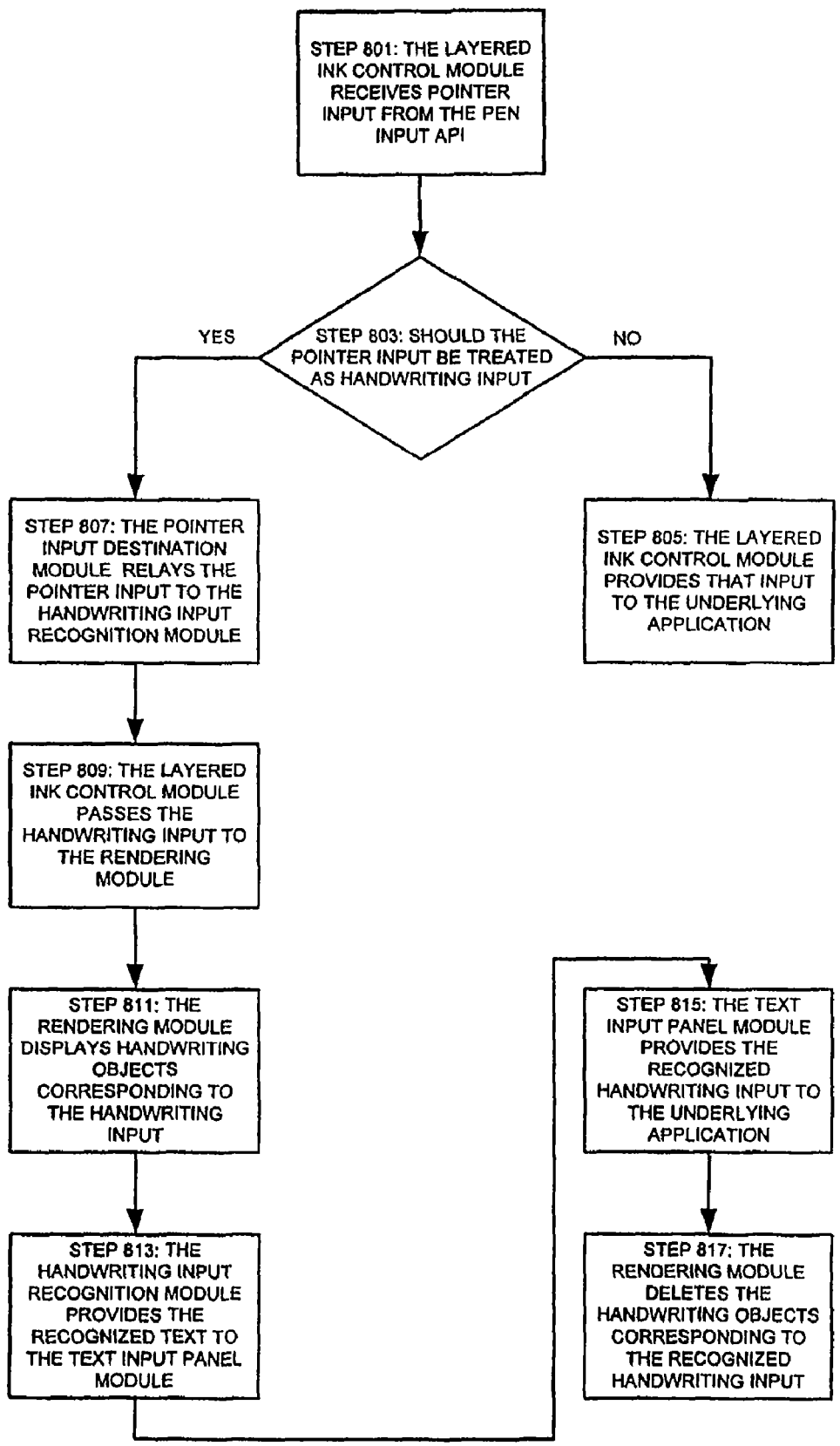
FIG. 8 illustrates a flowchart showing the steps of operation of a write anywhere tool according to one embodiment of the invention.

The operation of the write anywhere tool 701 will be described with reference to the flowchart shown in FIG. 8. In step 801, the layered ink control module 703 receives pointer input from the pen input API 715. Then, in step 803, the pointer input destination module 707 determines whether the pointer input should be treated as handwriting input or as input for an underlying application. Thus, the pointer input destination module 707 applies the heuristics that determine if pointer input qualifies as a quick tap, a hold through input, or a gesture representing a command for the underlying application as described above. Further, the pointer input destination module 707 determines if the pointer input was received at a position on the display area 201 corresponds to an underlying user interface 203 that has been designated an excluded window.

If the pointer input destination module 707 determines that the pointer input is input for the underlying application, then the layered ink control module 703 provides that input to the underlying application in step 805. With some embodiments of the invention, the layered ink control module 703 may provide the pointer input directly to the underlying application. Alternately, the layered ink control module 703 may simply return the pointer input to the pen input API 715 with directions to convey the pointer input to the underlying application. Once the underlying application receives the pointer input, it responds to the pointer input and displays the appropriate corresponding actions in the underlying application user interface.

On the other hand, if the pointer input destination module 707 determines that the pointer input is handwriting input, then it relays the pointer input to the handwriting input recognition module 705 for recognition in step 807. Further, the pointer input destination module 707 passes the handwriting input to the handwriting input to the rendering module 709 in step 809. The rendering module 709 then displays writing objects corresponding to the handwriting input in step 811. When the handwriting input recognition module 705 begins recognizing the handwriting input, the callback module 713 reports each initiation of the recognition process to the text input panel module 711. In turn, the text input panel module 711 displays an indicator to confirm to the user that the recognition process has started. This indicator, which may be, for example, a scrolling bar indicator or a spinning object, may be displayed by the rendering module 709 or by another display process.

The callback module 719 reports back to the text input panel module 711 as to the whether the status of the layered ink control module 703 is enabled or disabled. This information is useful to keep the input panel module appraised of the delay between when the layered ink control module 703 is initiated and when it actually begins operation. If the text input panel maintains a separate user interface for activating the transparent user interface 205, the result of this feedback may be displayed in that interface. For example, if the text input panel maintains a separate user interface in which a user can activate the transparent user interface 205 with a button, the button may be highlighted when the layered ink control module 703 is active.

When the handwriting input recognition module 705 has completed recognizing the handwriting input, it provides the recognized text to the text input panel module 711 in step 813. In turn, the text input panel module 711 provides the recognized handwriting input to the underlying application in step 815. The underlying application can then display the recognized text in the underlying application user interface. In addition, the layered ink control module 703 instructs the rendering module 709 to delete the handwriting objects corresponding to the recognized handwriting input in step 817. With some embodiments of the invention, the callback module 713 also informs the text input panel module 711 that the recognition process is completed. The text input panel module 711 may then display a status indicator confirming completion of the recognition process. This indicator may be displayed by the rendering module 709, or by another display process.

Turning now to the rendering module 709, the rendering module 709 implements an array of approximately 400 tiny layered windows over the display area 201. This type of window is identified as a layered window and can be created using the Win32 API in, for example, the Microsoft Windows® XP operating system. As known to those of ordinary skill in the art, this type of layered window is transparent but can contain graphical objects and still allow an underlying user interface 203 to be updated and viewed. More particularly, the appearance of the layered window is blended with underlying user interfaces 203 so that the user can clearly see the graphical objects in both. As the layered window is transparent (that is, it does not contain borders, or tool or menu bars), it functions as a transparent overlay to the underlying user interfaces 203.

As will be appreciated by those of ordinary skill in the art, this type of layered window cannot be partially updated, but must instead be updated in its entirety. Accordingly, providing a single layered window to encompass even a moderate portion of the display area 201 of would require significant processing resources. Because the appearance of the layered window is blended with the appearance of underlying user interfaces 203, each update of the underlying user interface 203 or the layered window would require significant processing time. The rendering module 709 therefore employs an array of hundreds of small layered windows. This conveniently reduces the processing time required to update any single layered window. Moreover, layered windows that do not contain graphical objects (that is, portions of the transparent user interface 205 that does not contain margin lines 209, guidelines 211, or handwriting objects) may be hidden until the pen input API 715 detects pointer input corresponding to that window.

The purpose of the text input panel module 711 is to provide multiple user interfaces for submitting data to the computer. For example, in addition to hosting the layered ink control module 703, the text input panel module 711 may also host other modules that provide the conventional single-purpose handwriting input user interface discussed above. Further, the text input panel module 711 may host modules for implementing a voice recognition process and a soft keyboard process. Thus, the text input panel module 711 receives the text recognized by the handwriting input recognition module 705 to relay it to the underlying application, as it may also receive additional recognized text from other processes to be relayed to the underlying application. Of course, those of ordinary skill in the art will appreciate that other software applications may host the layered ink control module 703 and the rendering module 709 in order to provide a transparent user interface 205 according to the invention.

CONCLUSION

Although the invention has been defined using the appended claims, these claims are exemplary in that the invention may include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. A method of processing pointer input, comprising:
providing a transparent first graphical user interface overlaying a second graphical user interface;
receiving pointer input in a handwriting area corresponding to the transparent first graphical user interface;
displaying a guideline at a first position when a pen contacts a first position in the handwriting area;
displaying the guideline at a second position only when the pen is lifted from the first position and subsequently contacts a second position in the handwriting area a threshold distance from the first position, wherein the threshold distance depends upon a direction of movement of the pen from the first position to the second position;

displaying handwriting objects represented by the pointer input in the transparent first graphical user interface;

recognizing text from the pointer input; and providing the recognized text to a software application.

2. The method of processing pointer input recited in claim 1, further comprising:

providing the recognized text to a software application hosting the second graphical user interface; and displaying the recognized text in the second graphical user interface such that the recognized text is visible through the transparent first graphical user interface.

3. The method of processing pointer input recited in claim 2, further comprising:

receiving the pointer input in a portion of the handwriting area also corresponding to the second graphical user interface.

4. The method of processing pointer input recited in claim 2, further comprising:

displaying a third graphical user interface hosted by a second software application that does not host the second graphical user interface; and receiving the pointer input in a portion of the handwriting area corresponding to the third graphical user interface.

5. The method of processing pointer input recited in claim 1, further comprising:

updating the second graphical user interface so that updates to the second graphical user interface are visible through the transparent first graphical user interface.

6. The method of processing pointer input recited in claim 1, further comprising:

displaying margins identifying the handwriting area.

7. The method of processing pointer input recited in claim 1, further comprising:

deleting the handwriting guideline when received pointer input will not be displayed in the transparent first graphical user interface.

8. The method of processing pointer input recited in claim 1, further comprising:

deleting the handwriting guideline when the pen has moved outside of the handwriting area.

9. The method of processing pointer input recited in claim 1, further comprising:

deleting the handwriting guideline when the pen has beyond a threshold distance above the handwriting area.

10. The method of processing pointer input recited in claim 1, comprising:

displaying the guideline at the second position only when the pen is lifted from the first position for a threshold amount of time and subsequently contacts the second position.

11. The method of processing pointer input recited in claim 10, wherein the threshold distance depends upon a direction of movement of the pen from the first position to the second position.

12. A computer readable medium having stored thereon computer executable instructions comprising:

providing a transparent first graphical user interface overlaying a second graphical user interface;

receiving pointer input in a handwriting area corresponding to the transparent first graphical user interface;

displaying a guideline at a first position when a pen contacts a first position in the handwriting area;

displaying the guideline at a second position only when the pen is lifted from the first position and subsequently contacts a second position in the handwriting area a threshold distance from the first position, wherein the threshold distance depends upon a direction of movement of the pen from the first position to the second position;

displaying handwriting objects represented by the pointer input in the transparent first graphical user interface;

recognizing text from the pointer input; and providing the recognized text to a software application.

13. The computer readable medium recited in claim 12, wherein the instructions further comprise:

providing the recognized text to a software application hosting the second graphical user interface; and displaying the recognized text in the second graphical user interface such that the recognized text is visible through the transparent first graphical user interface.

14. The computer readable medium recited in claim 13, wherein the instructions further comprise:

receiving the pointer input in a portion of the handwriting area also corresponding to the second graphical user interface.

15. The computer readable medium recited in claim 13, wherein the instructions further comprise:

displaying a third graphical user interface hosted by a second software application that does not host the second graphical user interface; and receiving the pointer input in a portion of the handwriting area corresponding to the third graphical user interface.

16. The computer readable medium recited in claim 12, wherein the instructions further comprise:

updating the second graphical user interface so that updates to the second graphical user interface are visible through the transparent first graphical user interface.

17. The computer readable medium recited in claim 12, wherein the instructions further comprise:

displaying margins identifying the handwriting area.

18. The computer readable medium recited in claim 12, wherein the instructions further comprise:

deleting the handwriting guideline when received pointer input will not be displayed in the transparent first graphical user interface.

19. The computer readable medium recited in claim 12, wherein the instructions further comprise:

deleting the handwriting guideline when the pen has moved outside of the handwriting area.

20. The computer readable medium recited in claim 12, wherein the instructions further comprise:

deleting the handwriting guideline when the pen has beyond a threshold distance above the handwriting area.

21. The computer readable medium recited in claim 12, comprising:

displaying the guideline at the second position only when the pen is lifted from the first position for a threshold amount of time and subsequently contacts the second position.

22. The computer readable medium recited in claim 21, wherein the threshold distance depends upon a direction of movement of the pen from the first position to the second position.

23. A system for processing pointer input comprising:

a processor; and memory having stored therein computer executable instructions comprising:

providing a transparent first graphical user interface overlaying a second graphical user interface;

receiving pointer input in a handwriting area corresponding to the transparent first graphical user interface;

displaying a guideline at a first position when a pen contacts a first position in the handwriting area;

displaying the guideline at a second position only when the pen is lifted from the first position and subsequently contacts a second position in the handwriting area a threshold distance from the first position, wherein the threshold distance depends upon a direction of movement of the pen from the first position to the second position;

displaying handwriting objects represented by the pointer input in the transparent first graphical user interface;

recognizing text from the pointer input; and providing the recognized text to a software application.

24. The system recited in claim 23, wherein the instructions further comprise:

providing the recognized text to a software application hosting the second graphical user interface; and displaying the recognized text in the second graphical user interface such that the recognized text is visible through the transparent first graphical user interface.

25. The system recited in claim 24, wherein the instructions further comprise:

receiving the pointer input in a portion of the handwriting area also corresponding to the second graphical user interface.

26. The system recited in claim 24, wherein the instructions further comprise:

displaying a third graphical user interface hosted by a second software application that does not host the second graphical user interface; and receiving the pointer input in a portion of the handwriting area corresponding to the third graphical user interface.

27. The system recited in claim 23, wherein the instructions further comprise:

updating the second graphical user interface so that updates to the second graphical user interface are visible through the transparent first graphical user interface.

28. The system recited in claim 23, wherein the instructions further comprise:

displaying margins identifying the handwriting area.

29. The system recited in claim 23, wherein the instructions further comprise:

deleting the handwriting guideline when received pointer input will not be displayed in the transparent first graphical user interface.

30. The system recited in claim 23, wherein the instructions further comprise:

deleting the handwriting guideline when the pen has moved outside of the handwriting area.

31. The system recited in claim 23, wherein the instructions further comprise:

deleting the handwriting guideline when the pen has beyond a threshold distance above the handwriting area.

32. The system recited in claim 23, comprising:

displaying the guideline at the second position only when the pen is lifted from the first position for a threshold amount of time and subsequently contacts the second position.

33. The system recited in claim 32, wherein the threshold distance depends upon a direction of movement of the pen from the first position to the second position.

* * * * *